US008731935B2

(12) United States Patent
Chavez et al.

(10) Patent No.: US 8,731,935 B2
(45) Date of Patent: May 20, 2014

(54) ISSUING ALERTS ON DETECTION OF CONTENTS OF INTEREST INTRODUCED DURING A CONFERENCE

(75) Inventors: Timothy R. Chavez, Austin, TX (US); Jacob Daniel Eisinger, Austin, TX (US); Jennifer Elizabeth King, Austin, TX (US); William R. Reichert, Arlington, VA (US)

(73) Assignee: Nuance Communications, Inc., Burlington, MA (US)

( * ) Notice: Subject to any disclaimer, the term of this patent is extended or adjusted under 35 U.S.C. 154(b) by 904 days.

(21) Appl. No.: 12/556,667

(22) Filed: Sep. 10, 2009

(65) Prior Publication Data

US 2011/0060591 A1    Mar. 10, 2011

(51) Int. Cl.
*G10L 21/00* (2013.01)

(52) U.S. Cl.
USPC ............ 704/270; 704/231; 704/251; 704/246

(58) Field of Classification Search
CPC ....... G10L 15/00; G10L 15/26; G10L 15/265; G10L 17/00; G10L 21/00; G10L 2015/00
USPC .................. 704/270, 232, 252, 246, 231, 251
See application file for complete search history.

(56) References Cited

U.S. PATENT DOCUMENTS

| | | | |
|---|---|---|---|
| 6,477,491 B1 * | 11/2002 | Chandler et al. .............. 704/235 |
| 6,747,685 B2 | 6/2004 | Taib et al. | |
| 6,853,716 B1 | 2/2005 | Shaffer et al. | |
| 8,019,069 B1 * | 9/2011 | Cyriac et al. ............. 379/202.01 |
| 2004/0047461 A1 * | 3/2004 | Weisman et al. ........ 379/202.01 |
| 2004/0186712 A1 | 9/2004 | Coles et al. | |
| 2004/0228463 A1 | 11/2004 | Sauvage | |
| 2005/0069116 A1 | 3/2005 | Murray | |
| 2008/0077869 A1 * | 3/2008 | Cho et al. ...................... 715/753 |
| 2009/0220064 A1 * | 9/2009 | Gorti et al. ............... 379/202.01 |
| 2010/0004028 A1 * | 1/2010 | Park et al. ..................... 455/566 |
| 2010/0036929 A1 | 2/2010 | Scherpa et al. | |

FOREIGN PATENT DOCUMENTS

EP    1811759    7/2007

* cited by examiner

*Primary Examiner* — Qi Han
(74) *Attorney, Agent, or Firm* — Sunstein Kann Murphy & Timbers LLP

(57) ABSTRACT

A method, system, and computer program product for issuing an alert in response to detecting a content of interest in a conference. A listening logic comprising multiple conference engines monitors speakers, topics, and words spoken during a conference. A speech-to-text engine monitors the conference and records a transcription. A word emphasis engine monitors the transcription for key words. A voice identification engine monitors the live conversation and the recorded transcript, in real time, for a particular individual to begin speaking. An outline engine may create an outline of transcription. The listening device may issue an alert upon detecting a content of interest in the conference. The listening device may additionally display an outline or a selected portion of the transcript regarding a particular content of interest to inform a user of the listening device of a portion of content of the conference that may have been missed.

14 Claims, 4 Drawing Sheets

US 8,731,935 B2

ISSUING ALERTS ON DETECTION OF CONTENTS OF INTEREST INTRODUCED DURING A CONFERENCE

BACKGROUND

1. Technical Field

The present disclosure relates in general to telecommunication systems, and in particular to teleconference systems. Still more particularly, the present disclosure relates a system for issuing an alert in response to detecting a content of interest in a conference.

2. Description of the Related Art

Often during conference calls a current topic being discussed does not always require a participants' complete attention. When not actively engaged, participants of a conference tend to devote their focus to other work. However, when the discussion moves to something more pertinent to a specific participant, the participant must snap to attention. This response may be needed when the participant's name is mentioned, a subject of particular interest is raised, or when another participant of importance begins speaking. However, sometimes in this situation an important discussion may have started before a participant became aware. In a face-to-face conversation one person may turn to the next person and ask for a synopsis of what just happened. However, during a teleconference, a subtle method for bringing a participant up to speed is not always possible.

SUMMARY

Disclosed is a method, system, and computer program product for issuing an alert in response to detecting a content of interest in a conference. A listening logic comprising multiple conference engines monitors speakers, topics, and words spoken during a conference. A speech-to-text engine monitors the conference and records a transcription. A word emphasis engine monitors the transcription for key words. A voice identification engine monitors the live conversation and the recorded transcript, in real time, for a particular individual to begin speaking. An outline engine may create an outline of transcription. The listening device may issue an alert upon detecting a content of interest (e.g., a particular topic is brought up, particular attendee is speaking, or a particular name is spoken) in the conference. The alert may be an audio, visual, or tactile (e.g. vibration) alert. The listening device may additionally display an outline or a selected portion of the transcript regarding a particular content of interest to inform a user of the listening device of a portion of content of the conference that may have been missed.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, will best be understood by reference to the following detailed descriptions of an illustrative embodiment when read in conjunction with the accompanying drawings, wherein:

DETAILED DESCRIPTION

The illustrative embodiments provide a method, system, and computer program product for alerting a user to a content of interest in a conference, in accordance with one embodiment of the invention.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
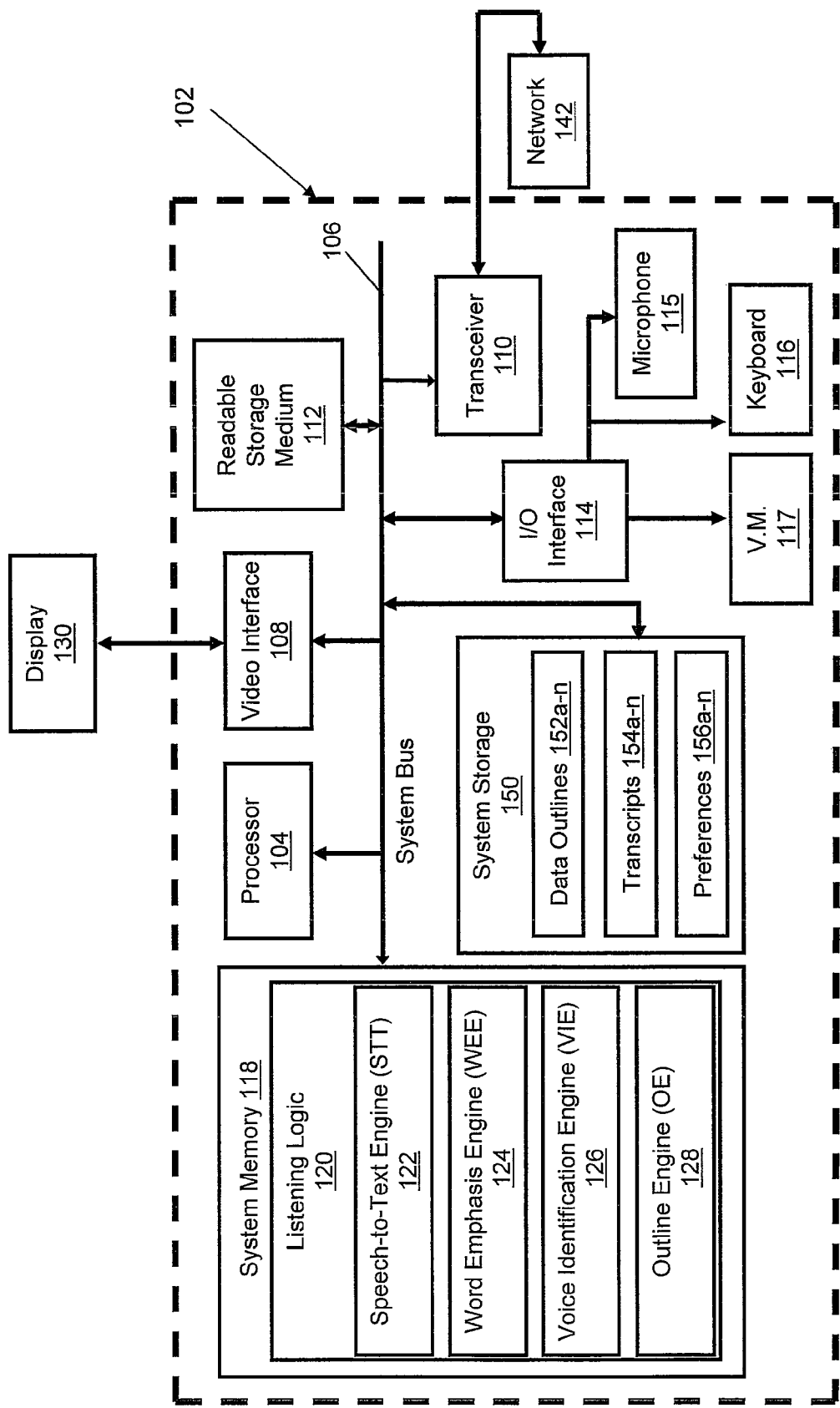
FIG. 1 is a block diagram of a listening device in which the present invention may be implemented.

With reference now to FIG. 1, there is depicted a block diagram of a listening device 102 in which the present invention may be implemented. Listening device 102 includes a processor 104 that is coupled to a system bus 106. A transceiver 110, connected to system bus 106, enables listening device 102 to connect to a network 142, via wired or wireless mechanisms, using protocols such as Plain Old Telephone System (POTS), Voice Over Internet Protocol (VoIP), or Transmission Control Protocol Internet Protocol (TCP/IP). A Video Interface 108, coupled to system bus 106, allows for the connection of a Display 130 to listening device 102 enabling a general user interface (including text and graphics) of listening device 102. System bus 106 also affords communication with a hardware-based readable storage medium 112 (e.g., Compact Disk-Read Only Memory (CD-ROM), flash drive memory, etc). Input/Output (I/O) Interface 114, also connected to system bus 106, permits user interaction with listening device 102, such as data entry via keyboard 116. Listening device 102 may also provide vibration feedback to a user through the use of vibration module (V.M.) 117. Listening device 102 may also monitor and/or record a live conference using Microphone 115.

Listening device 102 also comprises a system storage 150 which is connected to system bus 106. System Storage 150 comprises Data Outlines 152*a-n*, Transcripts 154*a-n*, and Preferences 156. Data Outlines 152*a-n* contain a plurality of data outlines for teleconferences previously monitored or currently being monitored by listening device 102. Transcripts 154*a-n* comprise of a plurality of transcripts for teleconferences previously monitored or currently being monitored by listening device 102. Preferences 156 may contain preference information for identifying contents of interest in a teleconference for one or more users.

Listening device 102 also comprises system memory 118, which is connected to system bus 106. As shown, system memory 118 also comprises listening logic 120. Listening logic 120 further comprises a plurality of engines for issuing alerts in response to detecting a content of interest in a teleconference. Among the plurality of engines are Speech-to-Text Engine (STT) 122, Word Emphasis Engine (WEE) 124, Voice Identification Engine (VIE) 126, and Outline Engine (OE) 128. Listening logic 120 includes code for implementing the processes described in FIGS. 2-4. In one embodiment, listening device 102 is able to utilize listening logic 120 to monitor a teleconference and issue one or more audio, visual, or tactile (e.g. vibration) pulse alerts in response to detecting a content of interest in a teleconference, as described in greater detail below in FIGS. 2-4.

As illustrated and described herein, listening device 102 may be any computing device (e.g., a computer or a mobile phone) having the required hardware components and programmed with listening logic 120, executing on the processor to provide the functionality of the invention. Additionally some of the aforementioned engines may be implemented in hardware. The hardware elements depicted in listening device 102 are not intended to be exhaustive, but rather are representative to highlight essential components required by and/or utilized to implement the present invention. For instance, listening device 102 may include alternate memory storage devices such as magnetic cassettes, Digital Versatile Disks (DVDs), Bernoulli cartridges, and the like. These alternate configurations of components and other variations are intended to be within the spirit and scope of the present invention.

Figure 2:
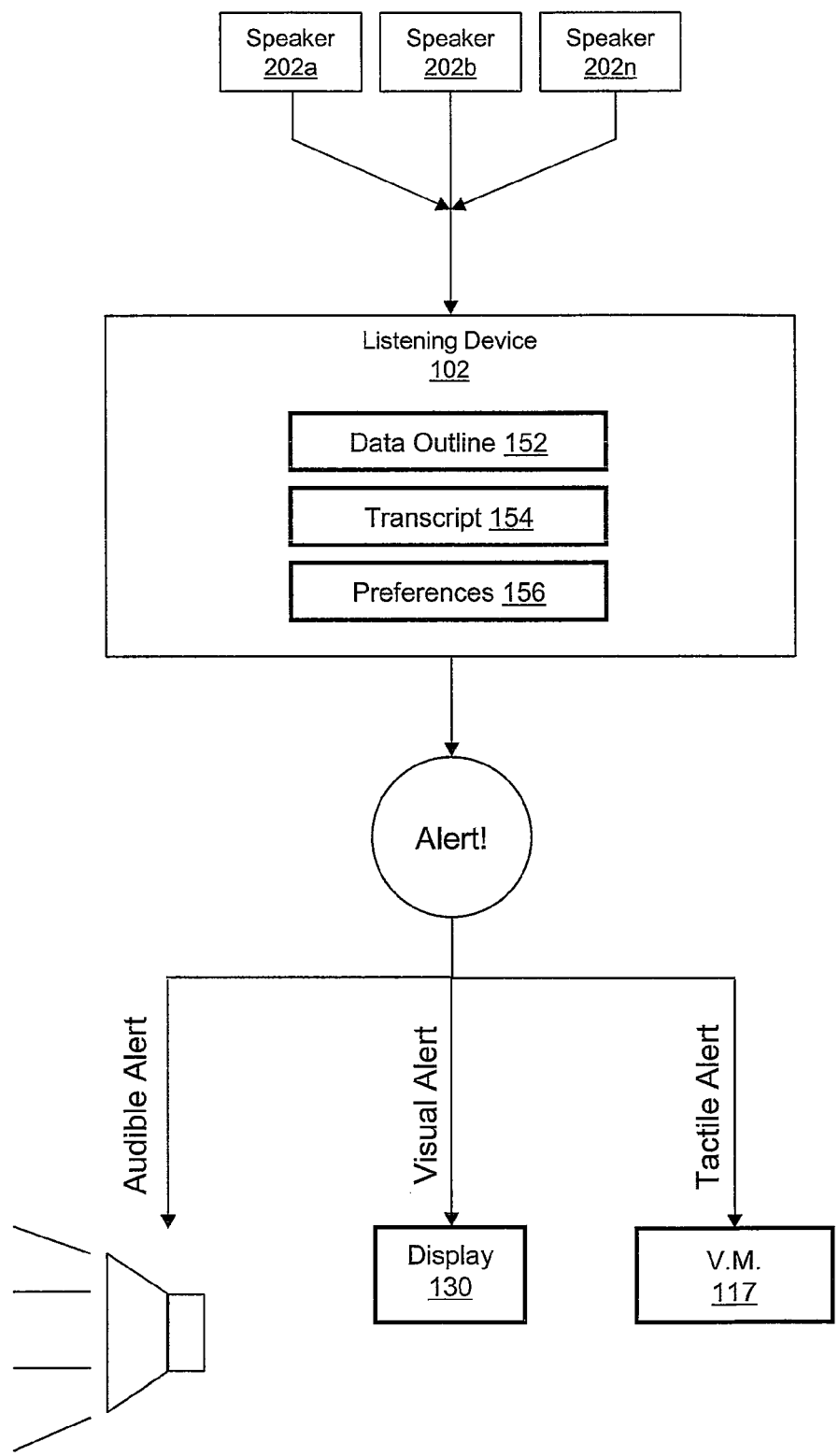
FIG. 2 is a block diagram of an exemplary system for alerting a user to a content of interest of a conference, according to one embodiment.

With reference now to FIG. 2, there is illustrated an exemplary system for alerting a user to a content of interest in a conference, in accordance with one embodiment of the invention. The conference may be a live conference taking place locally, or may be a teleconference occurring over a standard POTS phone connection, an internet based VOIP teleconference, or via a teleconference service. Listening device 102 reads preferences (e.g., Preferences 156) preset by/for a user to determine contents of interest of a specific user for a conference. In an alternate embodiment, contents of interest may be entered on the fly by a user of listening device 102. The preferences may be stored locally on listening device 102, or in an alternate embodiment the preferences may be stored on a computer (not pictured) connected to a same network as listening device 102. The contents of interest are determined through the use of one or more engines of listening logic 120, such as Speech-to-Text Engine (STT) (e.g., STT 122), Word Emphasis Engine (WEE) (e.g., WEE 124), and a Voice Identification Engine (VIE) (e.g., VIE 126). A content of interest may be a particular topic, a particular attendee that is speaking, detection of a particular name spoken, etc. Listening logic 120 operating on listening device 102 may determine contents of interest within a conference in real time by monitoring verbal utterances by speakers 102*a-n* of the conference.

STT 122 monitors spoken verbal utterances and records the verbal utterances to a transcript (e.g., transcript 154) of the monitored conference in real-time. STT 122 may also interface further with VIE 126 to determine the speaker 202*a-n* of a particular portion of the detected content. In this manner a combination of STT 122 and VIE 126 are able to identify or tag portions of a transcript to actual words spoken by each individual speaker 202*a-n* of the conference. In one embodiment, a resultant transcript may identify both speakers 202*a-n* and words spoken by the speakers 202*a-n* of a conference in their order of occurrence, similar to a movie script. An outline engine (e.g., Outline Engine 128) may also utilize the transcript to create a data graph (not pictured) or data outline (e.g., data outline 152) of the transcript. A data graph is a representation of the conferences using visual shapes and text.

WEE 124 identifies each occurrence of targeted words, topics, or speakers 202*a-n* in a conversation. In one embodiment, WEE 124 monitors a transcript, in real time, for the occurrence of a one or more specific words or topics, or for a specific speaker 202*a-n* to begin speaking. Any occurrence of targeted words, topics, or speakers 202*a-n* of the conference may be a portion of a content of interest or the content of interest itself. In an alternate embodiment, WEE 124 may monitor the actual live conference and/or the transcript. During a conference, WEE 124 continually monitors for the contents of interest. In response to WEE 124 identifying a specific word, topic, or in response to WEE 124 identifying that a specific speaker 202*a-n* has begun speaking, listening logic 120 may issue an alert.

An alert issued by listening device 102 may comprise any combination of audio, visual, or tactile pulse alerts. A visual alert may consist of any combination of a flash of a color or a pattern of colors on a display, an alert pop-up window on a display, or a text notification message viewable on a display. The visual alert may contain information relevant to the detected content of interest. Furthermore, a visual alert may be accompanied by a portion of the transcript related to the detected content of interest, and the listening logic may display the selected portion of the transcript on the display. In this manner, listening device 102 is able to provide an alert indicating that a content of interest was just missed, while simultaneously displaying a portion of the transcript relevant to the content of interest now being discussed and what each speaker 202*a-n* has recently said regarding the specified content of interest.

An audio alert may consist of the playing of a specific sound sample to alert the user to the detection of a content of interest. The sound sample may be a pre-recorded sound effect or recording, or may also be a voice alert or snippet of a portion of the conference. In an alternate embodiment, an audio alert may be the raising of the volume level of the conference, to alert a participant of an identified content of interest.

Listening logic may also issue a tactile pulse alert through the use of a vibration module (V.M. 117) of listening device 102. The vibration pulse alert itself may also be a particular pattern or sequence of pulses to alert the user to specific contents of interest.

Figure 3:
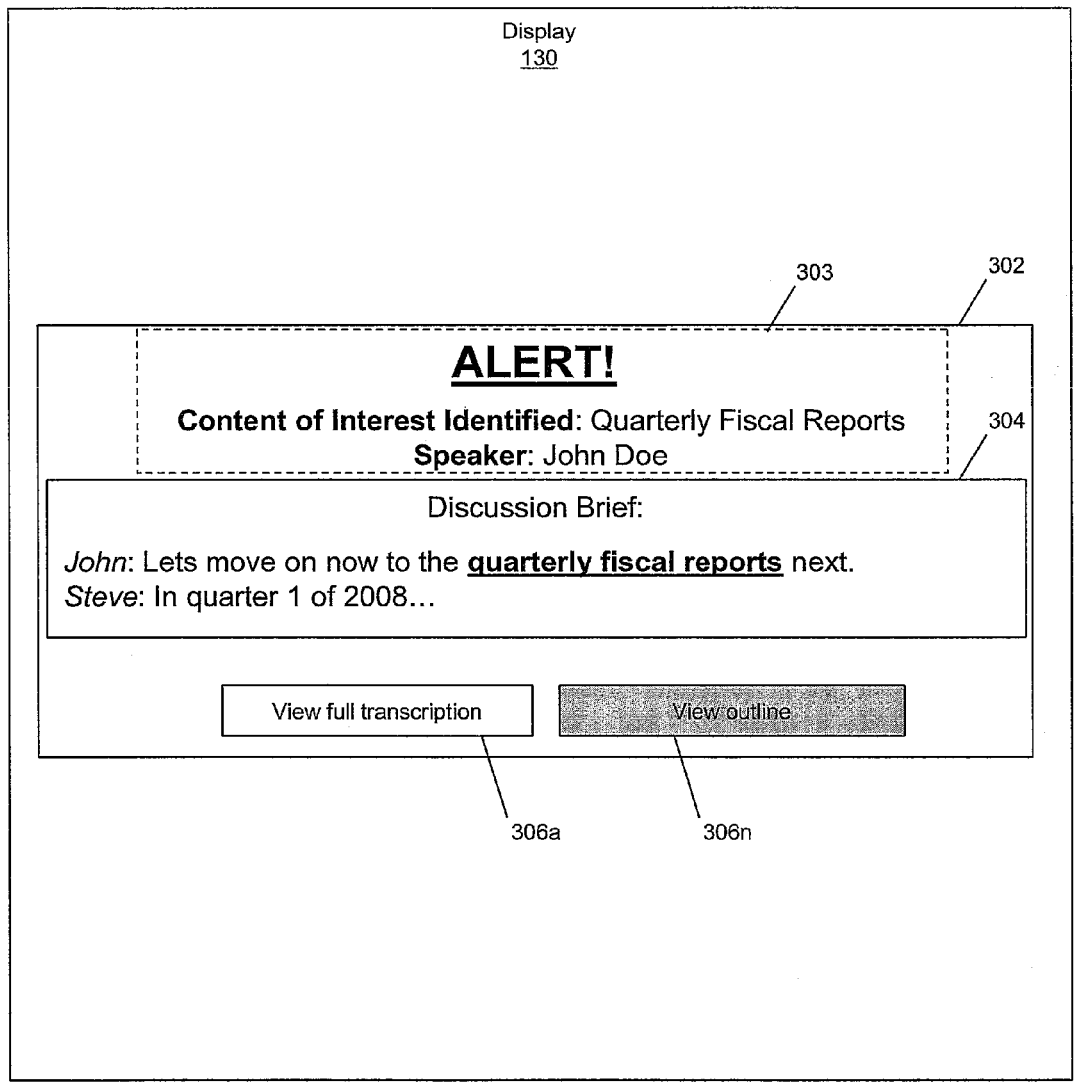
FIG. 3 is a diagram of an exemplary user interface for alerting a user to a content of interest of a conference, according to one embodiment.

With reference now to FIG. 3, there is illustrated an exemplary user interface of a visual alert issued by listening device 102. Visual alert 302 may comprise an alert brief 303 and a discussion brief 304 relevant to an identified content of interest. The alert brief 303 specifies the specific content of interest(s) identified, and provides relevant information on the content of interest, such as the speaker, topic, or words related to the identified content of interest. The discussion brief 304 may contain an excerpt of a transcription, data outline, or data graph relevant to the identified content of interest. Additionally, the visual alert 302 may contain contextual buttons 306*a-n* to allow a user to select to view the full transcription, data outline, or data graph of the current conference to that content.

Figure 4:
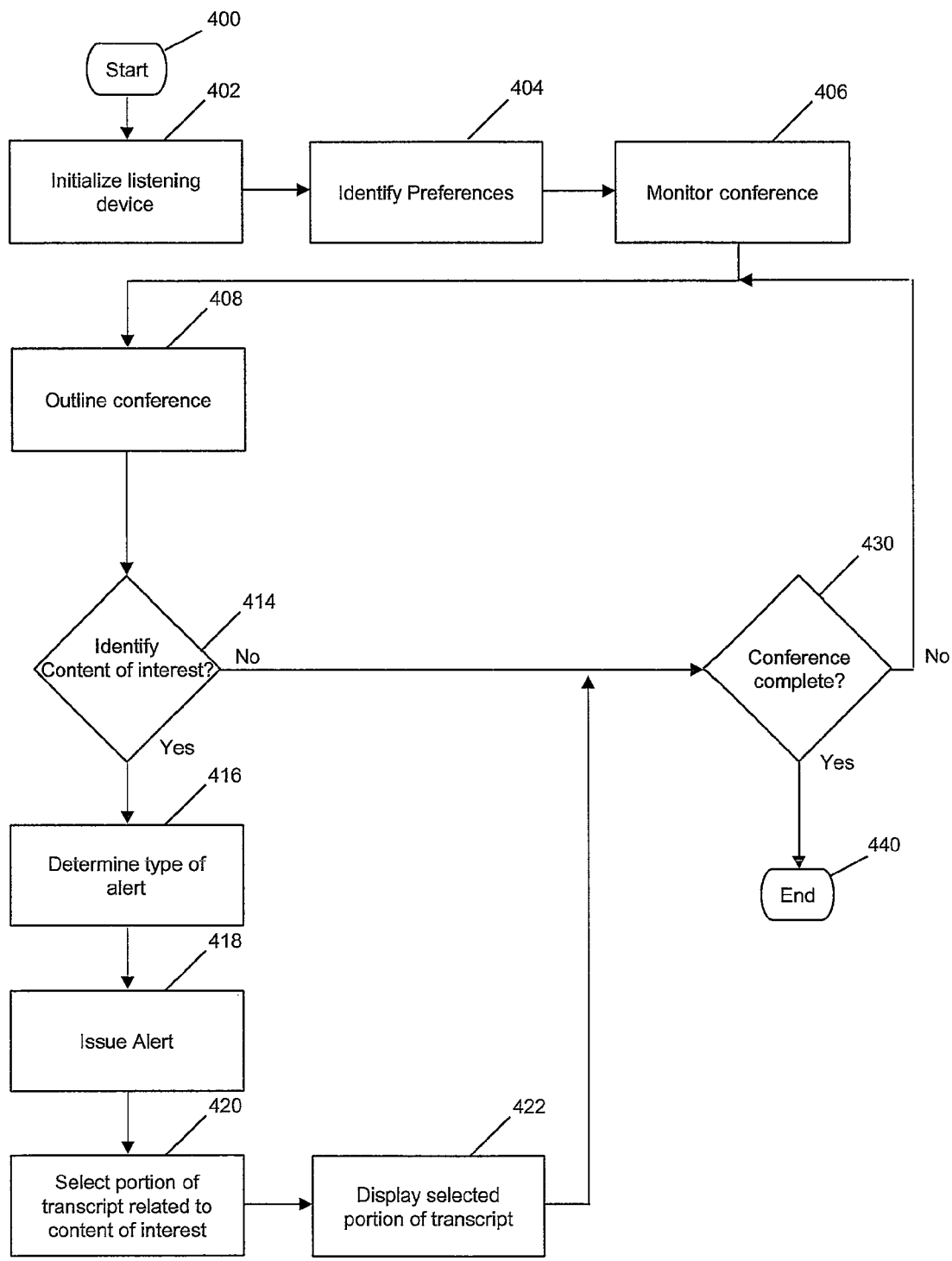
FIG. 4 is a high-level logical flowchart of the process for alerting a user to a content of interest of a conference, according to one embodiment.

With reference now to FIG. 4, there is provided a high-level flow chart of an exemplary method for alerting a user to a content of interest in a conference. After initiator block 400, the listening device is initialized (block 402). The listening device reads preferences stored in system storage (block 404). The preferences include preferences for monitoring and recording the conference, preferences for issuing alerts, and preferences for determining contents of interest. The listening device begins monitoring verbal utterances of the conference (block 406). The conference is continually outlined (block 408) for the duration of the conversation.

At block 414 a determination is made if a content of interest is detected. When a content of interest has been detected, an alert is issued (block 416) based on preferences identified in block 404. At block 416 listening logic may then determine the type(s) of alert that should be issued (audible, visual, tactile). In response to determining the type(s) of alert that should be issued, the listening device issues the appropriate alert(s) (block 418). At block 420 listening logic selects a portion of the transcript related to the detected content of interest. The selected portion of the transcript is then displayed on listening device (block 422).

At block 430 a determination is then made if the conference is complete. If the conference is not complete the process continues to block 408 in an iterative manner. When the conference has completed the process ends at terminator block 440.

In the flow charts above, one or more of the methods are embodied such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Although aspects of the present invention have been described with respect to a computer processor and program application/logic, it should be understood that at least some aspects of the present invention may alternatively be implemented as a program product for use with a data storage system or computer system. Programs defining functions of the present invention can be delivered to a computer-readable storage medium, data storage system, or computer system via a variety of signal-bearing media, which include, without limitation, non-writable storage media (e.g. CD-ROM), writable storage media (e.g. network attached storages, hard disk drive, read/write CD-ROM, optical media), and communication media, such as computer and telephone networks including Ethernet. It should be understood, therefore, that such signal-bearing media, when carrying or encoding computer readable instructions that direct method functions of the present invention, represent alternative embodiments of the present invention. Further, it is understood that the present invention may be implemented by a system having means in the form of hardware, software, or a combination of software and hardware as described herein or their equivalent. Additionally, the present invention may be implemented in a machine in the form of a computer-readable storage medium having a plurality of instructions embodied executing on a processing device.

Having thus described the invention of the present application in detail and by reference to illustrative embodiments thereof, it will be apparent that modifications and variations are possible without departing from the scope of the invention defined in the appended claims. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for issuing an alert in response to detecting a content of interest in a conference, the method comprising:
    reading a plurality of monitoring preferences for a conference, including:
        (a) preferences for monitoring and recording verbal utterances exchanged during the conference, and
        (b) preferences for determining contents of interest of the conference, wherein each content of interest corresponds to one or more items from a group consisting of specific topics, specific persons, and specific names;
    determining one or more target contents of interest of the conference;
    based on the monitoring preferences, monitoring verbal utterances exchanged during the conference to:
        i. determine an occurrence of one or more contents of interest, and
        ii. produce a real time transcript of the verbal utterances including providing a name of a corresponding utterance speaker for each utterance; and
    in response to detecting a content of interest, simultaneously:
        i. displaying a selected portion of the transcript related to the detected content of interest, and
        ii. issuing one or more alert notifications alerting of the occurrence of an identified content of interest of the conference.

2. The method of claim 1, wherein the alert is a visual alert, and issuing one or more the visual alerts further comprises at least one of:
    providing an on-screen flash on a display,
    displaying an alert window on the display, and
    presenting a text notification message on the display.

3. The method of claim 2, wherein the visual alert contains information relevant to the detected content of interest and is accompanied by a simultaneous display of a portion of the transcript related to the detected content of interest including what each speaker has recently said regarding the specified content of interest.

4. The method of claim 1, wherein recording a transcript further comprises:
    determining a speaker of a particular portion of the detected content; and
    tagging portions of the transcript to actual words spoken by each individual speaker of the conference, in their order of occurrence.

5. The method of claim 1, further comprising creating at least one of a data graph and a data outline of the transcript, wherein the data graph is a representation of the conferences using visual shapes and text.

6. The method of claim 1, wherein the alert is an audible alert from among a specific sound sample to alert a user to detection of the content of interest, wherein the sound sample is one of a pre-recorded sound effect or recording, a voice alert, and a snippet of a portion of the conference.

7. The method of claim 1, wherein the alert is an audible alert and wherein issuing one or more alerts comprises raising an audio volume level of the conference.

8. The method of claim 1, wherein the alert is a vibration pulse alert that has a particular pattern or sequence of pulses to alert the user to specific contents of interest.

9. A listening device comprising:
a processor;
a memory coupled to the processor;
processing logic executing on the processor that causes the listening device to:
  read a plurality of monitoring preferences for a conference, including:
    (a) preferences for monitoring and recording verbal utterances exchanged during the conference, and
    (b) preferences for determining contents of interest of the conference wherein each content of interest corresponds to one or more items from a group consisting of specific topics, specific persons, and specific names;
  determine one or more target contents of interest of the conference;
  monitor, via a listening device based on the monitoring preferences, verbal utterances exchanged during the conference to:
    i. determine an occurrence of one or more contents of interest, and
    ii. produce a real time transcript of the verbal utterances including providing a name of a corresponding utterance speaker for each utterance; and
  in response to detecting a content of interest, simultaneously.:
    i. display a selected portion of the transcript related to the detected content of interest, and
    ii. issue one or more alert notifications alerting of the occurrence of an identified content of interest of the conference and wherein the alert is one or more of a visual alert, an audible alert, and a vibration pulse alert.

10. The listening device of claim 9, wherein the alert is a visual alert, and the processing logic that causes the device to issue one or more alerts further comprises processing logic that causes the device to perform at least one of:
provide an on-screen flash on a display;
display an alert window on the display; and
present a text message on the display.

11. The listening device of claim 9, wherein the one or more alerts is an audible alert comprises, and the processing logic that causes the device to issue the one or more alerts comprises processing logic that cause the device to perform one or more of:
  (a) raise an audio volume level of the conference; and
  (b) provide a specific sound sample to alert a user to detection of the content of interest, wherein the sound sample is one of a pre-recorded sound effect or recording, a voice alert, and
  a snippet of a portion of the conference.

12. A computer-readable storage device having a plurality of instructions embodied therein, wherein the plurality of instructions, when executed by a processing device, allows a machine to:
  read a plurality of monitoring preferences for a conference, the monitoring preferences further comprising:
    i. preferences for monitoring and recording verbal utterances exchanged during the conference, and
    ii. preferences for determining contents of interest of the conference, wherein each content of interest corresponds to one or more items from a group consisting of specific topics, specific persons, and specific names;
  determine one or more target contents of interest of the conference;
  monitor, via a listening device based on the monitoring preferences, verbal utterances exchanged during the conference to:
    i. determine an occurrence of one or more contents of interest, and
    ii. produce a real time transcript of the utterances including providing a name of a corresponding utterance speaker for each utterance; and
  in response to detecting a content of interest, simultaneously:
    display a selected portion of the transcript related to the detected content of interest, and
    ii. issue one or more alert notifications alerting of the occurrence of an identified content of interest of the conference.

13. The computer-readable storage medium of claim 12, wherein the alert is a visual alert, and the instructions that cause the machine to issue the one or more alerts comprises instructions that cause the machine to perform at least one of:
provide an on-screen flash on a display;
display an alert window on the display; and
present a text message on the display.

14. The computer-readable storage medium of claim 12, wherein the alert is an audible alert, and the instructions that cause the machine to issue the one or more alerts comprises instructions that cause the machine to perform one or more of:
  (a) raise an audio volume level of the conference; and
  (b) provide a specific sound sample to alert a user to detection of the content of interest,
  wherein the sound sample is one of a pre-recorded sound effect or recording, a voice alert, and a snippet of a portion of the conference.

* * * * *